United States Patent
Sasaki

(10) Patent No.: US 10,508,943 B2
(45) Date of Patent: Dec. 17, 2019

(54) THERMAL MASS FLOW RATE MEASUREMENT METHOD, THERMAL MASS FLOW METER USING SAID METHOD, AND THERMAL MASS FLOW CONTROLLER USING SAID THERMAL MASS FLOW METER

(71) Applicant: Hitachi Metals, Ltd., Minato-ku, Tokyo (JP)

(72) Inventor: Akira Sasaki, Mie (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 15/300,599

(22) PCT Filed: Feb. 20, 2015

(86) PCT No.: PCT/JP2015/054779
§ 371 (c)(1),
(2) Date: Sep. 29, 2016

(87) PCT Pub. No.: WO2015/151638
PCT Pub. Date: Oct. 8, 2015

(65) Prior Publication Data
US 2017/0115148 A1    Apr. 27, 2017

(30) Foreign Application Priority Data
Mar. 31, 2014 (JP) .................. 2014-072019

(51) Int. Cl.
*G01F 1/696* (2006.01)
*G01F 1/684* (2006.01)
*G01F 15/00* (2006.01)

(52) U.S. Cl.
CPC ............ *G01F 1/696* (2013.01); *G01F 1/6847* (2013.01); *G01F 15/002* (2013.01)

(58) Field of Classification Search
CPC ... G01F 1/72; G01F 1/785; G01F 1/68; G01F 1/69; G01F 1/6847; G01F 1/698; G01F 1/6986
(Continued)

(56) References Cited

U.S. PATENT DOCUMENTS 4,464,932 A * 8/1984 Ewing ............... G01F 1/6847
73/204.15
4,672,997 A * 6/1987 Landis .............. G01F 1/6847
137/554

(Continued)

FOREIGN PATENT DOCUMENTS

JP    06222841 A    8/1994
JP    09218065 A    8/1997

(Continued)

OTHER PUBLICATIONS

Japan Patent Office, "International Search Report and Written Opinion re Application No. PCT/JP2015/054779", dated Apr. 2, 2015, p. 10 Published in: JP.

Primary Examiner — Lisa M Caputo
Assistant Examiner — Tran M. Tran
(74) *Attorney, Agent, or Firm* — Neugborn O'Dowd PC

(57) ABSTRACT

By supplying a pulse signal to sensor wires to make the sensor wires generate heat, instead of applying DC electric voltage to the sensor wires, an amount of energy supplied to the sensor wires is decreased while maintaining a signal intensity supplied to the sensor wires, or the signal intensity supplied to the sensor wires is increased while maintaining the amount of energy supplied to the sensor wires. Thereby, a method for measuring a mass flow rate by a thermal type mass flow meter, which can reduce heat generation from the sensor wires while suppressing decrease in measurement accuracy, or can improve measurement accuracy while sup- (Continued)

pressing increase in heat generation from the sensor wires, is provided.

11 Claims, 4 Drawing Sheets

(58) Field of Classification Search
USPC .................................................. 73/204.14
See application file for complete search history.

(56) References Cited

U.S. PATENT DOCUMENTS

| | | | | |
|---|---|---|---|---|
| 4,680,964 A * | 7/1987 | Sato | ........ | G01F 1/698 73/114.34 |
| 4,753,111 A * | 6/1988 | Caron | ........ | G01F 1/684 73/204.14 |
| 4,779,458 A * | 10/1988 | Mawardi | ........ | G01F 1/684 374/41 |
| 4,813,280 A * | 3/1989 | Miller, Jr. | ........ | G01F 1/6847 73/273 |
| 4,872,339 A * | 10/1989 | Gerhard | ........ | G01F 1/6986 702/47 |
| 4,888,987 A * | 12/1989 | Zhang | ........ | G01D 5/12 73/204.14 |
| 4,921,005 A * | 5/1990 | Ohmi | ........ | G01F 1/6847 137/486 |
| 4,966,033 A * | 10/1990 | Nishimura | ........ | F02D 41/187 73/114.34 |
| 5,038,609 A * | 8/1991 | Kumada | ........ | G01F 1/6888 73/204.24 |
| 5,062,446 A * | 11/1991 | Anderson | ........ | G05D 7/0635 137/468 |
| 5,150,611 A * | 9/1992 | Kleinhans | ........ | G01F 1/6986 73/204.14 |
| 5,272,915 A * | 12/1993 | Gelbach | ........ | G01F 1/698 73/147 |
| 5,309,762 A * | 5/1994 | Satoh | ........ | G01F 5/00 73/202.5 |
| 5,347,861 A * | 9/1994 | Satoh | ........ | G01F 1/6847 73/204.12 |
| 5,359,878 A * | 11/1994 | Mudd | ........ | G01F 1/6847 73/1.16 |
| 5,373,737 A * | 12/1994 | Hwang | ........ | G01F 1/6847 73/204.22 |
| 5,417,110 A * | 5/1995 | Wood | ........ | G01F 1/692 73/204.15 |
| 5,439,026 A * | 8/1995 | Moriya | ........ | G05D 7/0635 137/486 |
| 5,526,696 A * | 6/1996 | Cappi | ........ | G01F 1/7084 73/861.95 |
| 5,582,628 A * | 12/1996 | Wood | ........ | G01F 1/692 73/204.14 |
| 5,654,507 A * | 8/1997 | Hicks | ........ | G01F 1/692 73/204.14 |
| 5,711,342 A * | 1/1998 | Kazama | ........ | G05D 7/0635 137/486 |
| 5,865,205 A * | 2/1999 | Wilmer | ........ | G05D 7/0635 137/2 |
| 5,911,238 A * | 6/1999 | Bump | ........ | G01F 1/6842 137/486 |
| 6,289,746 B1 * | 9/2001 | Fu | ........ | G01F 1/7084 73/204.14 |
| 6,386,050 B1 * | 5/2002 | Yin | ........ | A61M 5/16886 73/204.14 |
| 6,389,364 B1 * | 5/2002 | Vyers | ........ | G01F 1/6847 137/486 |
| 6,443,003 B1 * | 9/2002 | Bailis | ........ | G01F 1/684 73/204.12 |
| 6,453,739 B1 * | 9/2002 | Saikalis | ........ | G01F 1/6986 73/204.14 |
| 6,539,791 B1 * | 4/2003 | Weber | ........ | G01F 1/6986 73/204.14 |
| 6,550,324 B1 * | 4/2003 | Mayer | ........ | G01F 1/6986 73/204.14 |
| 6,637,264 B2 * | 10/2003 | Lotters | ........ | G01F 1/6847 73/204.27 |
| 6,655,408 B2 * | 12/2003 | Linthorst | ........ | G01S 5/0009 137/10 |
| 6,706,535 B2 * | 3/2004 | Sacks | ........ | G01N 30/32 73/23.42 |
| 6,732,581 B1 * | 5/2004 | Torresin | ........ | A61B 5/0878 73/204.14 |
| 6,736,005 B2 * | 5/2004 | McMillan | ........ | G01F 1/6847 73/204.21 |
| 6,904,793 B2 * | 6/2005 | Kanke | ........ | F02D 9/1035 73/114.34 |
| 7,000,464 B2 * | 2/2006 | McMillan | ........ | G01F 1/6847 73/204.21 |
| 7,058,532 B1 * | 6/2006 | Yamagishi | ........ | G01F 1/684 702/100 |
| 7,089,804 B2 * | 8/2006 | Luchsinger | ........ | G01F 1/6986 73/861 |
| 7,140,384 B2 * | 11/2006 | Kang | ........ | G01F 1/6847 137/487.5 |
| 7,177,770 B1 * | 2/2007 | Hocken | ........ | F02D 41/187 702/33 |
| 7,261,004 B2 * | 8/2007 | Breen | ........ | G01F 1/6986 73/861.95 |
| 7,380,564 B2 * | 6/2008 | Lull | ........ | G01F 25/0007 118/715 |
| 7,399,401 B2 * | 7/2008 | Rush | ........ | A61M 5/14216 73/861.08 |
| 7,481,574 B2 * | 1/2009 | Ariyoshi | ........ | G01F 1/6845 374/11 |
| 7,591,177 B2 * | 9/2009 | Sugimoto | ........ | G01F 1/6847 73/204.27 |
| 7,613,582 B2 * | 11/2009 | Kanke | ........ | G01F 1/6845 702/100 |
| 7,693,606 B2 * | 4/2010 | Ahmad | ........ | G01F 1/6847 700/28 |
| 7,823,444 B2 * | 11/2010 | Zschernack | ........ | A61B 5/0878 73/204.15 |
| 7,856,874 B2 * | 12/2010 | Tsypko | ........ | G01F 1/6847 73/204.13 |
| 7,934,432 B2 * | 5/2011 | Kuhn | ........ | G01F 1/712 73/861.28 |
| 7,980,126 B2 * | 7/2011 | Opitz | ........ | G01F 1/6986 73/204.26 |
| 8,036,780 B2 * | 10/2011 | Gotoh | ........ | G05D 7/0635 137/2 |
| 8,356,623 B2 * | 1/2013 | Isobe | ........ | G01F 1/6842 137/486 |
| 8,485,219 B2 * | 7/2013 | Goto | ........ | G01F 1/6847 137/487.5 |
| 8,783,088 B2 * | 7/2014 | Weaver | ........ | G01F 25/0015 73/1.22 |
| 8,800,592 B2 * | 8/2014 | Goto | ........ | G05D 7/0635 137/486 |
| 8,857,461 B2 * | 10/2014 | Goto | ........ | G01F 1/6847 137/487.5 |
| 8,893,743 B2 * | 11/2014 | Okabe | ........ | G01F 1/68 118/715 |
| 8,915,262 B2 * | 12/2014 | Smirnov | ........ | G05D 7/0635 137/486 |
| 9,091,578 B2 * | 7/2015 | Okano | ........ | G01F 1/684 |
| 9,417,108 B2 * | 8/2016 | Ito | ........ | G01F 1/78 |
| 9,471,066 B2 * | 10/2016 | Ding | ........ | G01F 25/003 |
| 9,632,511 B2 * | 4/2017 | Hirata | ........ | G01F 25/0007 |
| 9,702,745 B2 * | 7/2017 | Schuller | ........ | G01F 1/6847 |
| 9,857,210 B2 * | 1/2018 | Mantinband | ........ | G01F 1/68 |
| 2002/0190733 A1 * | 12/2002 | Kinoshita | ........ | G01F 1/6842 324/713 |
| 2006/0124173 A1 * | 6/2006 | An | ........ | G05D 7/0635 137/487.5 |
| 2009/0235735 A1 | 9/2009 | Tsypko | | |
| 2010/0294021 A1 * | 11/2010 | Makino | ........ | G01N 25/18 73/25.03 |

(56) References Cited

U.S. PATENT DOCUMENTS

| | | | | |
|---|---|---|---|---|
| 2013/0125643 A1* | 5/2013 | Batty | .................. | G01F 1/692 73/204.14 |
| 2014/0116128 A1* | 5/2014 | Mantinband | .......... | G01F 1/6847 73/204.11 |
| 2015/0006092 A1* | 1/2015 | Grohmann | ............ | G01F 1/6847 702/45 |
| 2015/0027221 A1* | 1/2015 | Aizawa | ................ | G01F 1/6847 73/204.23 |

FOREIGN PATENT DOCUMENTS

| | | | |
|---|---|---|---|
| JP | 1038652 | A | 2/1998 |
| JP | H10253415 | A | 9/1998 |
| JP | 2005300486 | A | 10/2005 |
| JP | 2009192220 | A | 8/2009 |

* cited by examiner

THERMAL MASS FLOW RATE MEASUREMENT METHOD, THERMAL MASS FLOW METER USING SAID METHOD, AND THERMAL MASS FLOW CONTROLLER USING SAID THERMAL MASS FLOW METER

BACKGROUND

Field

The present invention relates to a method for measuring a flow rate (flow rate measurement method) in a thermal type mass flow meter (thermal mass flow meter), a thermal type mass flow meter which uses the method, and a thermal type mass flow control device (thermal mass flow controller) which uses the thermal type mass flow meter.

Background

Mass flow meters have been widely used for the purpose of measuring a mass flow rate of a process gas supplied into a chamber in a manufacturing process of a semiconductor, for example. In addition, a mass flow meter is not only used independently as mentioned above, but is also used as a part which constitutes a mass flow control device (mass flow controller) with other members, such as a flow control valve and a control circuit. Although there are various kinds of mass flow meters in the art, a thermal type mass flow meter is used widely among them since a mass flow rate of a fluid (for example, a gas and a liquid) can be measured accurately with a relatively simple configuration.

Generally, a thermal type mass flow meter is constituted by a passage through which a fluid flows, a bypass which is prepared in the middle of the passage, a sensor tube which branches from the passage on an upstream side of the bypass and joins the passage again on a downstream side of the bypass, a pair of sensor wires wound around the sensor tube and a sensor circuit which comprises a bridge circuit including the sensor wires and other resistive elements (see for example, Japanese Patent Application Laid-Open "kokai" No. 2009-192220 official report). The bypass has a flow resistance against a fluid, and is constituted so that a constant proportion of a fluid which flows through the passage branches into the sensor tube.

In the above-mentioned configuration, when the pair of sensor wires is made to generate heat by applying a predetermined electric voltage (or a predetermined electric current) thereto, heat generated from the sensor wires is removed (drawn) by a fluid which flows through the sensor tube. As a result, the fluid which flows through the sensor tube is heated. In this case, the sensor wire on the upstream side has its heat removed by the fluid which has not yet been heated. On the other hand, the sensor wire on the downstream side has its heat removed by the fluid which has been already heated with the sensor wire on the upstream side. For this reason, the heat removed from the sensor wire on the upstream side is larger than the heat removed from the sensor wire on the downstream side. As a result, temperature of the sensor wire on the upstream side becomes lower than temperature of the sensor wire on the downstream side. For this reason, an electrical resistance value of the sensor wire on the upstream side becomes lower than an electrical resistance value of the sensor wire on the downstream side. A difference in the electrical resistance value resulting from thus produced temperature difference between the sensor wire on the upstream side and the sensor wire on the downstream side becomes larger, as a mass flow rate of the fluid which flows through the sensor tube becomes larger.

A change of the difference in the electrical resistance value between the sensor wire on the upstream side and the sensor wire on the downstream side according to a mass flow rate of the fluid as mentioned above can be detected by using a bridge circuit, etc., for example. Furthermore, based on thus detected difference in change of the electrical resistance value of the sensor wire, a mass flow rate of the fluid which flows through the sensor tube can be obtained, and a mass flow rate of the fluid which flows through the passage can be obtained based on the mass flow rate of the fluid which flows through the sensor tube (will be mentioned later in detail). In this specification, a portion including a sensor tube and sensor wires of a thermal type mass flow meter is referred to as a "flow sensor."

As a material for a sensor tube, a material which has an excellent corrosion resistance and an excellent mechanical strength is desirable, and metal (namely, conductor), such as a stainless steel, is used generally. On the other hand, as a matter of course, a conductor is used as a material for a sensor wire. Namely, in general, both the materials for a sensor tube and a sensor wire are conductors. Therefore, it is general in a flow sensor that, for the purpose of prevention of electric continuity between a sensor tube and sensor wires and electric continuity between sensor wires and fixation of sensor wires to a sensor tube, etc., a covering layer formed of an insulation material, such as resin, for example, is disposed in the surroundings of a portion of the sensor tube where the sensor wires are wound and in the surroundings of the sensor wires (will be mentioned later in detail).

In addition, in order to measure a mass flow rate by a flow sensor, as mentioned above, heat generated from sensor wires due to electrification needs to be removed by a sensor tube and a fluid which flows through the sensor tube. Therefore, it is desirable that at least a covering layer which intervenes between sensor wires and a sensor tube has good thermal conductivity.

SUMMARY

As a result of wholehearted investigation, the present inventor has found that the above-mentioned objective of the present invention can be achieved by decreasing energy amount (electric energy) supplied to sensor wires by an input signal (electrical signal) inputted to the sensor wires for the purpose of heat generation while maintaining a signal intensity (electric voltage value or electric current value) of the input signal, or by increasing the signal intensity of the input signal while maintaining the energy amount supplied to the sensor wires by the input signal. Specifically, the present inventor has found that the above-mentioned objective of the present invention can be achieved by supplying a pulse signal (for example, pulse electric voltage and pulse electric current, etc.) to sensor wires as an input signal, instead of applying DC electric voltage (or DC electric current) to sensor wires as in the case of a conventional technology, to make the sensor wires generate heat.

Namely, a method for measuring a flow rate in a thermal type mass flow meter according to the present invention is a method for measuring a flow rate (thermal mass flow rate measurement method) in a thermal type mass flow meter comprising:

a passage through which a fluid flows, a bypass which is prepared in the middle of said passage, a flow sensor which comprises a sensor tube that branches from said passage on an upstream side of said bypass and joins said passage again on a downstream side of said bypass, and a pair of sensor wires which is disposed so as to be not in direct contact with said fluid which flows through said sensor tube, but be able to conduct heat with the fluid which flows through said sensor tube, a power supply which is configured to supply an input signal for generating heat from said sensor wires to said sensor wires, and a sensor circuit which comprises a bridge circuit including said sensor wires, wherein:

said method includes;

supplying, as said input signal, a pulse signal whose signal intensity changes temporally so as to be either a first intensity or a second intensity lower than said first intensity, to said sensor wires, acquiring, as an output signal intensity, a signal intensity of the output signal which corresponds to said input signal whose signal intensity is said first intensity and is detected when a range of fluctuation of the signal intensity of the output signal per unit time is not more than a predetermined threshold value, among output signals outputted from said sensor circuit as a result of said pulse signal being supplied to said sensor wires, and calculating a flow rate of said fluid based on said output signal intensity.

Advantageous Effects of Invention

In accordance with the method for measuring a flow rate in a thermal type mass flow meter according to the present invention, heat generation from sensor wires can be reduced while suppressing decrease in measurement accuracy, or measurement accuracy can be improved while suppressing increase in heat generation from sensor wires.

DETAILED DESCRIPTION

Figure 1:
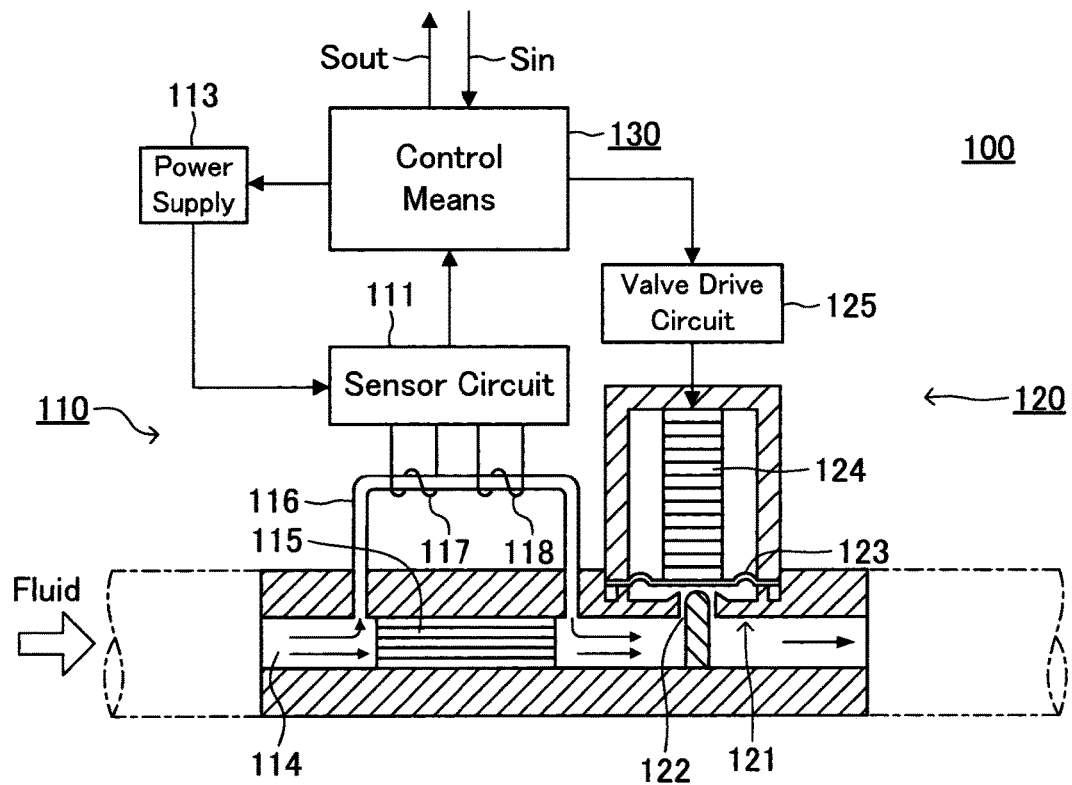
FIG. 1 is a schematic diagram for showing an example of a configuration of a thermal type mass flow control device including a thermal type mass flow meter, to which a method for measuring a flow rate in a thermal type mass flow meter is applied according to one embodiment of the present invention.

As mentioned above, in a flow sensor which a thermal type mass flow meter comprises, a mass flow rate of a fluid which flows through a sensor tube can be obtained by utilizing a difference in the amount of heat removed from a sensor wire generating heat due to supply of a predetermined input signal (namely, application of a predetermined voltage or electric current) by the fluid flowing through the sensor tube between a sensor wire on an upstream side and a sensor wire on a downstream side. Namely, in order to measure a mass flow rate of a fluid using a thermal type mass flow meter, it is necessary to supply a predetermined input signal to sensor wires and to make the sensor wires generate heat.

However, some problems occur in relation to supplying a predetermined input signal to sensor wires and making the sensor wires generate heat as mentioned above. Specifically, there is a possibility that a temporal change of a covering layer and sensor wires, deterioration of a fluid and a thermal syphoning phenomenon, etc. associated with heat generation from the sensor wires may occur, and, specifically, it may become impossible for a thermal type mass flow meter to measure a mass flow rate of a fluid correctly, for example (will be mentioned later in detail).

As a technique for solving the above-mentioned problems, it can be considered to reduce heat generation from sensor wires. However, when heat generation from sensor wires is reduced, there is a possibility that temperature difference between a sensor wire on an upstream side and a sensor wire on a downstream side resulting from flow of a fluid may become smaller, as a result, an output power from a sensor circuit may become weaker and an S/N ratio (signal-to-noise ratio) of a detection signal may fall, and measurement accuracy of a mass flow rate may fall.

On the contrary, in order to strengthen an output power from a sensor circuit to raise an S/N ratio of a detection signal and to improve measurement accuracy of a mass flow rate, it is necessary to increase heat generation from sensor wires. However, in this case, there is a possibility that the above-mentioned problems resulting from heat generation from sensor wires may get worse as a result. In addition, since it is necessary to increase electric energy supplied to sensor wires (namely, it is necessary to increase an electric voltage or electric current applied to the sensor wires) in order to increase heat generation from the sensor wire, it leads to increase in power consumption in the sensor wires.

By the way, in a thermal type flow meter configured to detect a flow rate of a fluid using heat dissipation of a heat-generating resistance element which constitutes a bridge circuit and is disposed in the fluid, a technology for reducing power consumption in the heat-generating resistance element by supplying DC (Direct Current) electric power to the heat-generating resistance element only in a time period, during which a detection signal is acquired (see for example, Japanese Patent Application Laid-Open "kokai" No. H09-218065 official report). In such a flow meter, since a heat-generating resistance element is in direct contact with a fluid, a time period required to reach a thermal equilibrium state after starting a supply of DC electric power to the heat-generating resistance element is short (a thermal time constant is small), and a time period, during which DC electric power is supplied to the heat-generating resistance element can be shorten. As a result, power consumption in the heat-generating resistance element can be reduced.

However, in a capillary heating type thermal type mass flow meter wherein DC electric power is supplied to sensor wires wound around a sensor tube branched from a passage, through which a fluid flows, to generate heat, it is difficult to reduce power consumption in the sensor wires by intermittently supplying DC electric power to the sensor wires as mentioned above. Specifically, in a capillary heating type thermal type mass flow meter, sensor wires are not in direct contact with a fluid. Namely, since heat generated from sensor wires in a capillary heating type thermal type mass flow meter is removed not only by a fluid, but also by a sensor tube (heat capacity is large), time needed for reaching a thermal equilibrium state is long (a thermal time constant is large). Therefore, it is difficult to reduce power consumption in sensor wires by sufficiently shortening a time period, during which DC electric power is supplied to the sensor wires.

In addition, in a capillary heating type thermal type mass flow meter, since the heat capacity is large and the thermal time constant is large, a time period required to reach a thermal equilibrium state after stopping a supply of DC electric power to sensor wires is long. Therefore, since influence of a thermal history by previous heat generation by the sensor wires remains for a relatively long time period, it is necessary to lengthen a time period during which DC electric power is not supplied to the sensor wires in order to eliminate the influence of the thermal history as in the above-mentioned conventional technology.

Namely, when a flow rate of a fluid is measured by intermittently supplying DC electric power to sensor wires like the above-mentioned conventional technology in a capillary heating type thermal type mass flow meter, it is necessary to lengthen both of a time period during which the DC electric power is not supplied to the sensor wires and a time period during which the DC electric power is supplied to the sensor wires. As a result, a frequency, at which DC electric power is supplied to sensor wires to acquire a detection signal, decreases. Therefore, such a measurement method is not suitable for uses in which it is desired to always monitor an accurate flow rate of a fluid (for example, a use in which a mass flow rate of a fluid (process gas) supplied into a chamber in a manufacturing process of a semiconductor is measured, etc.).

As mentioned above, in a thermal type mass flow meter according to a conventional technology, it is difficult to achieve a balance between suppression of various problems resulting from heat generation from sensor wires and improvement in measurement accuracy of a mass flow rate. Namely, in the art, a new technology which can suitably balance suppression of various problems resulting from heat generation from sensor wires and maintenance and improvement in measurement accuracy of a mass flow rate is demanded. For example, a method for measuring a mass flow rate by a thermal type mass flow meter, which can reduce heat generation from sensor wires while suppressing decrease in measurement accuracy, or can improve measurement accuracy while suppressing increase in heat generation from sensor wires, is demanded. Therefore, one of objectives of the present invention is to provide a method for measuring a mass flow rate by a thermal type mass flow meter, which can reduce heat generation from sensor wires while suppressing decrease in measurement accuracy, or can improve measurement accuracy while suppressing increase in heat generation from sensor wires.

As mentioned above, in the art, a method for measuring a mass flow by a thermal type mass flow meter, which can reduce heat generation from sensor wires while suppressing decrease in measurement accuracy, or can improve measurement accuracy while suppressing increase in heat generation from sensor wires, is demanded.

Then, as a result of wholehearted investigation, the present inventor has found that the above-mentioned objective of the present invention can be achieved by decreasing energy amount (electric energy) supplied to sensor wires by an input signal (electrical signal) inputted to the sensor wires for the purpose of heat generation while maintaining a signal intensity (electric voltage value or electric current value) of the input signal, or by increasing the signal intensity of the input signal while maintaining the energy amount supplied to the sensor wires by the input signal. Specifically, the present inventor has found that the above-mentioned objective of the present invention can be achieved by supplying a pulse signal (for example, pulse electric voltage and pulse electric current, etc.) to sensor wires as an input signal, instead of applying DC electric voltage (or DC electric current) to sensor wires as in the case of a conventional technology, to make the sensor wires generate heat, and has come to conceive the present invention.

Namely, a first embodiment of the present invention is,

A method for measuring a flow rate (thermal mass flow rate measurement method) in a thermal type mass flow meter comprising:
a passage through which a fluid flows,
a bypass which is prepared in the middle of said passage,
a flow sensor which comprises a sensor tube that branches from said passage on an upstream side of said bypass and joins said passage again on a downstream side of said bypass, and a pair of sensor wires which is disposed so as to be not in direct contact with said fluid which flows through said sensor tube, but be able to conduct heat with the fluid which flows through said sensor tube,
a power supply which is configured to supply an input signal for generating heat from said sensor wires to said sensor wires, and
a sensor circuit which comprises a bridge circuit including said sensor wires, wherein:
said method includes;
supplying, as said input signal, a pulse signal whose signal intensity changes temporally so as to be either a first intensity or a second intensity lower than said first intensity, to said sensor wires,
acquiring, as an output signal intensity, a signal intensity of the output signal which corresponds to said input signal whose signal intensity is said first intensity and is detected when a range of fluctuation of the signal intensity of the output signal per unit time is not more than a predetermined threshold value, among output signals outputted from said sensor circuit as a result of said pulse signal being supplied to said sensor wires, and
calculating a flow rate of said fluid based on said output signal intensity.

As mentioned above, a thermal type mass flow meter, to which the method for measuring a flow rate in a thermal type mass flow meter according to the present embodiment is applied, is a common thermal type mass flow meter which has a configuration well-known in the art. Specifically, the method for measuring a flow rate in a thermal type mass flow meter according to the present embodiment can be applied to a thermal type mass flow meter which has a configuration as follows.

A thermal type mass flow meter (thermal mass flow meter) comprising:

a passage through which a fluid flows, a bypass which is prepared in the middle of said passage, a flow sensor which comprises a sensor tube that branches from said passage on an upstream side of said bypass and joins said passage again on a downstream side of said bypass, and a pair of sensor wires which is disposed so as to be not in direct contact with said fluid which flows through said sensor tube, but be able to conduct heat with the fluid which flows through said sensor tube, a power supply which is configured to supply an input signal for generating heat from said sensor wires to said sensor wires, and a sensor circuit which comprises a bridge circuit including said sensor wires.

Figure 2:
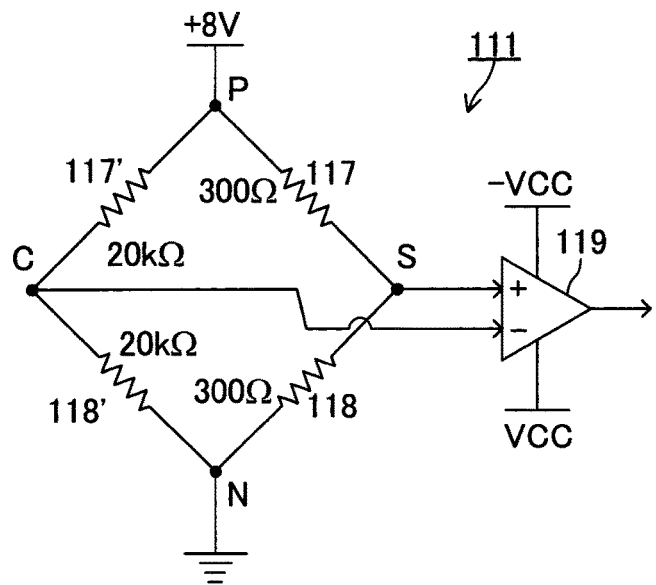
FIG. 2 is a schematic diagram for showing an example of a configuration of a sensor circuit which a thermal type mass flow meter, to which a method for measuring a flow rate in a thermal type mass flow meter according to one embodiment of the present invention is applied, comprises.

Here, an example of a configuration of a thermal type mass flow meter, to which a method for measuring a flow rate in a thermal type mass flow meter according to the present embodiment is applied, will be explained in detail below, referring to accompanying drawings. FIG. 1 is a schematic diagram for showing an example of a configuration of a thermal type mass flow control device including a thermal type mass flow meter, to which a method for measuring a flow rate in a thermal type mass flow meter according to one embodiment of the present invention is applied, as mentioned above. Furthermore, FIG. 2 is a schematic diagram for showing an example of a configuration of a sensor circuit which a thermal type mass flow meter, to which a method for measuring a flow rate in a thermal type mass flow meter according to one embodiment of the present invention is applied, comprises, as mentioned above.

As shown in FIG. 1, a thermal type mass flow control device 100 includes a thermal type mass flow meter 110, a flow rate adjustment means 120, and a control means 130 (corresponding to a "first control part" and a "second control part" that will be mentioned later). The thermal type mass flow meter 110 is constituted by a passage 114 through which a fluid flows, a bypass 115 prepared in the middle of the passage 114, a sensor tube 116 which branches from the passage 114 on an upstream side of the bypass 115 and joins the passage 114 again on a downstream side of the bypass 115, a pair of sensor wires 117 and 118 which is wound around the sensor tube 116, and a sensor circuit 111 which comprises a bridge circuit containing the sensor wires 117 and 118 and other resistive elements 117' and 118' as shown in FIG. 2. The bypass 115 has a flow resistance against a fluid and is configured so that a fixed proportion of a fluid which flows through the passage 114 branches to the sensor tube 116. In the configuration shown in FIG. 1, a pair of the sensor wires 117 and 118 is wound around the sensor tube 116. However, as long as heat generated from sensor wires can be conducted to a fluid which flows through a sensor tube, a specific placement of sensor wires is not limited in particular.

In the above-mentioned configuration, Joule's heat is generated when a predetermined input signal (electrical signal) is supplied (inputted) to the sensor wires 117 and 118 from a power supply 113, and this heat is removed by a fluid which flows through the sensor tube 116. In this case, the sensor wire 117 on the upstream side has its heat removed by the fluid which is not yet heated, while the sensor wire 118 on the downstream side has its heat removed by the fluid which has been already heated with the sensor wire 117 on the upstream side. For this reason, temperature of the sensor wire 118 on the downstream side becomes higher than temperature of the sensor wire 117 on the upstream side. As a result, electrical resistance of the sensor wire 118 on the downstream side becomes higher than electrical resistance of the sensor wire 117 on the upstream side. An input signal (electrical signal) supplied (inputted) to sensor wires for the purpose of heat generation may be controlled based on either an electric voltage or an electric current.

The difference (ratio) between the electrical resistance values thus resulting from temperature difference between the sensor wire 117 on the upstream side and the sensor wire 118 on the downstream side changes according to a mass flow rate of the fluid which flows through the sensor tube 116. As a result, potential difference between a point S and a point C of the sensor circuit 111 also changes according to the mass flow rate of the fluid which flows through the sensor tube 116. A mass flow rate of the fluid which flows through the sensor tube 116 can be measured by detecting such a change of the potential difference, for example, through an operational amplifier 119. Furthermore, based on the mass flow rate of the fluid which flows through the sensor tube 116 thus measured, a mass flow rate of the fluid which flows through the passage 114 can be calculated. Namely, the thermal type mass flow control device 100 is a capillary heating type thermal type mass flow meter.

In the sensor circuit shown in FIG. 2, the sensor wires 117 and 118, which have a resistance value of 300Ω respectively, are connected in series at the point S, and the other resistive elements 117' and 118', which have a resistance value of 20 kΩ respectively, are connected in series at the point C. Furthermore, the both ends of the sensor wires 117 and 118 and both ends of the other resistive elements 117' and 118', which are respectively connected in series as mentioned above, are connected at a point P and a point N, respectively. Namely, the sensor wires 117 and 118 and the resistive elements 117' and 118' constitute what is called a "Wheatstone bridge."

At the time of measuring a mass flow rate, a predetermined input signal (electrical signal) is supplied (inputted) between the above-mentioned point P and point N from the power supply 113, and a Joule's heat is generated from the sensor wires 117 and 118. Furthermore, the point S and the point C are connected respectively to a non-inverting input (+) and an inverting input (−) of the operational amplifier 119, and a signal according to potential difference between the point S and the point C is acquired as an output of the operational amplifier 119. Based on an output signal thus obtained from the operational amplifier 119, a mass flow rate of a fluid which flows through the sensor tube 116 can be measured. However, when the electrical resistances of the other resistive elements 117' and 118' are affected by the influence of heat generation from the sensor wires 117 and 118, the mass flow rate of the fluid which flows through the sensor tube 116 cannot be measured accurately. Therefore, the other resistive elements 117' and 118' are disposed at a position and/or state where they are not substantially affected by the influence of heat generation from the sensor wires 117 and 118.

In addition, as mentioned above, FIG. 1 is a schematic diagram for showing an example of a configuration of a thermal type mass flow control device including a thermal type mass flow meter to which the method for measuring a flow rate in a thermal type mass flow meter according to one embodiment of the present invention is applied. Therefore, as mentioned above, in FIG. 1, the flow rate adjustment means 120 and the control means 130, etc. are also illustrated, besides the thermal type mass flow meter 110. Since these will be explained later in detail in explanations about embodiments of the present embodiment as a thermal type mass flow meter and a thermal type mass flow control device, they will not be explained here.

By the way, as a material of a sensor tube, a material which has an excellent corrosion resistance and an excellent mechanical strength is desirable, and metal (namely, conductor), such as a stainless steel, is used generally, as mentioned above. On the other hand, as a matter of course, a conductor is used as a material of a sensor wire. Specifically, as a material of a sensor tube, a material which has an excellent corrosion resistance and an excellent mechanical strength, such as stainless-steel materials including SUS316 defined by Japanese Industrial Standards (JIS), for example, is used. On the other hand, as a material of a sensor wire, a conductor which have a desired electrical resistance value, such as an enameled wire, for example, (for example, metals, such as Cu, etc.) is used. Namely, in general, all the materials of a sensor tube and a sensor wire are conductors.

Therefore, when contact between a sensor tube and sensor wires or contact between sensor wires (for example, windings of sensor wires wound around a sensor tube, etc.) occurs, an electrical resistance value of a sensor wire falls. As a result, heat generation from the sensor wires resulting from supply of an input signal may become insufficient, or sensitivity of a flow sensor may fall. For these reasons, it needs to be electrically insulated between a sensor tube and sensor wires and between sensor wires. Furthermore, sensor wires need to be fixed at a predetermined position of a sensor tube.

Then, it is general in a flow sensor that, for the purpose of prevention of electric continuity between a sensor tube and sensor wires and electric continuity between sensor wires, and fixation of sensor wires to a sensor tube, etc., a covering layer formed of an insulation material, such as resin, for example, is disposed on a predetermined portion of a sensor tube and sensor wires and a surface of sensor wires, etc. Here, an example of a configuration of the covering layer will be explained in detail, referring to accompanying drawings.

Figure 3:
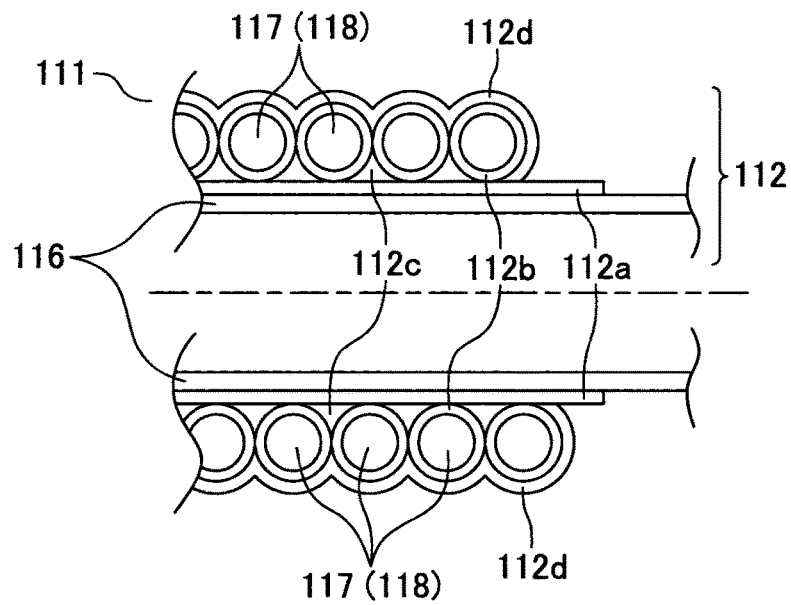
FIG. 3 is a schematic diagram for showing an example of a cross-sectional structure adjacent to a portion where sensor wires are wound around a sensor tube in a flow sensor.

FIG. 3 is a schematic diagram for showing an example of a cross-sectional structure adjacent to a portion where sensor wires are wound around a sensor tube in a flow sensor, as mentioned above. Namely, in the example shown in FIG. 3, the sensor wires 117 and 118 are wound around the sensor tube 116 in a shape of a coil, and the covering layer 112 is formed in the surroundings of the sensor tube 116 and the sensor wires 117 and 118. The covering layer 112 can be divided into four portions shown below according to their locations and functions.

A first covering layer 112a is prepared in contact with the surface of the sensor tube 116, and constitutes an isolation layer which prevents electric continuity (electrical connection) between the sensor tube 116 and the sensor wires 117 and 118. A second covering layer 112b is prepared in contact with the surfaces of the sensor wires 117 and 118, and constitutes an isolation layer which prevents electric continuity between the sensor wire 117 and 118 themselves. A third covering layer 112c is prepared in a space surrounded by the first covering layer 112a and the second covering layer 112b, and has a function to fix the sensor wires 117 and 118 to the sensor tube 116. A fourth covering layer 112d is prepared so as to cover the whole portion where the sensor wires 117 and 118 are wound around the sensor tube 116, and has a function to fix the sensor wires 117 and 118 mutually. In the present specification, layers which cover at least a portion where the sensor wires 117 and 118 are wound around the sensor tube 116, such as the above-mentioned first covering layer 112a to fourth covering layer 112d, for example, is collectively referred to as a "covering layer" (112).

By the way, as mentioned above, in order to measure a mass flow rate by a flow sensor, heat generated from sensor wires needs to be removed by a fluid which flows through a sensor tube. Therefore, at least a covering layer which intervenes between sensor wires and a sensor tube needs to have good heat conductivity. Therefore, a function as an electric insulator, a function as an adhesive and a function as a heat conductor are needed for a material which constitutes the covering layer. Furthermore, a material which can be formed as a thin film on surfaces of a sensor tube and sensor wires and has sufficient flexibility so that no crack occurs even when a sensor wire with the cover layer formed on its surface is wound around a sensor tube is preferred. From such a viewpoint, as a material of a covering layer for a flow rate sensor according to a conventional technology, polyamide imide or polyimide is suitably used. Especially, polyimide is more preferable since it has very high heat resistance. However, as mentioned above, some problems occur in relation to supplying a predetermined input signal to sensor wires and making the sensor wires generate heat.

First, as a first problem, a temporal change of a member which constitutes a flow sensor due to heat generated from sensor wires can be mentioned. Cause of the temporal change is classified roughly into two. One cause is that a sensor wire which is one of members which constitute a flow sensor generates heat and raises its temperature and thereby its internal stress is relieved and an electrical resistance value changes with time. A sensor wire has internal stress resulting from plastic forming at the time of manufacture. In addition, internal stress of a sensor wire is further increased by being wound around a sensor tube to occur plastic deformation. Such internal stress is relieved by heat generation and temperature rising of sensor wires, and electrical resistance values of sensor wires change in connection therewith.

Another cause of the temporal change is a variation of external stress which acts on sensor wires from a covering layer existing in the surroundings of the sensor wires. It has been known that resin materials, such as polyimide, which constitutes a covering layer, is gradually decomposed by a reaction with moisture and/or oxygen in the air when being held at an elevated temperature. When a covering layer is thus decomposed to disappear, the external stress which the sensor wire had received from the covering layer will be relieved. As a result, electrical resistance values of sensor wires change.

The electrical resistance value of the sensor wire 117 on an upstream side and the electrical resistance value of the sensor wire 118 on a downstream side are initially adjusted so that they are balanced at a predetermined proportion (ratio) at the time of manufacture of a thermal type mass flow meter. However, when the electrical resistance values of the sensor wires change due to the above-mentioned temporally change, the above-mentioned balance collapses and it becomes a cause of a detection error of a flow rate. Such a detection error of a flow rate, which is generated over time, may be referred to as a "zero-point variation." The larger heat generation from the sensor wires is, the more quickly for a shorter time period the zero-point variation appears.

Next, as a second problem, deterioration and/or denaturation of a fluid which flows through a sensor tube due to heat generated from sensor wires is mentioned. When temperature of an installation environment of a thermal type mass flow meter is a room temperature, temperature of sensor wires is raised to 90 to 95° C., a part of heat generated from the sensor wires is removed by the fluid, and temperature of the fluid rises. Depending on a kind of the fluid, the fluid may be deteriorated and/or denatured due to the temperature-rise at this time, and it may become difficult to correctly measure a mass flow rate with a thermal type mass flow meter.

For example, chlorine gas (Cl2) easily reacts with moisture etc. even at an ordinary temperature and generates a chlorine compound. Since such a reactivity of chlorine gas increases as temperature rises higher, it is desirable to make temperature-increment of a fluid due to heat generation from sensor wires as small as possible when measuring a mass flow rate of chlorine gas using a thermal type mass flow meter.

Furthermore, as a third problem, deviation of a measured value (zero-point variation) due to what is called a "thermal syphoning phenomenon" is mentioned. The thermal syphoning phenomenon is a phenomenon in which an unintended flow of a fluid, such as a convection of a fluid, for example, occurs resulting from that the fluid heated by heat generation from sensor wires goes up in a sensor tube, in a configuration wherein a direction of a sensor tube is a vertical direction, for example. When such a phenomenon happens, a value of a mass flow rate is measured even in a situation where the fluid does not flow actually, for example. Thus, when a thermal syphoning phenomenon happens, it may lead to a case where a mass flow rate of the fluid in the sensor tube does not reflect a mass flow rate of the fluid in a passage accurately. As a result, it may become difficult to measure a mass flow rate correctly with a thermal type mass flow meter.

In addition, the same phenomenon as the above may happen also in the exterior of a sensor tube. For example, air which exists in the surroundings of sensor wires is heated by heat generation from the sensor wires, and the convection of air may arise. Also in this case, it may become difficult to correctly measure a mass flow rate with a thermal type mass flow meter. Needless to say, the larger heat generation from sensor wires is, the more easily a phenomenon as mentioned above happen.

As mentioned above, all of the above-exemplified problems can be reduced and/or eased by decreasing heat generation from sensor wires. However, when heat generation from sensor wires is decreased, there is a possibility that an output power from a sensor circuit may become weaker and an S/N ratio (signal-to-noise ratio) of a detection signal may fall, and measurement accuracy of a mass flow rate may fall, as mentioned above.

Then, as a result of wholehearted investigation, the present inventor has found that heat generation from sensor wires can be reduced while suppressing decrease in measurement accuracy, by supplying a pulse signal (for example, pulse electric voltage and pulse electric current, etc.) to sensor wires as an input signal, instead of applying DC electric voltage (or DC electric current) to sensor wires as in the case of a conventional technology, to make the sensor wires generate heat.

Therefore, in a thermal type mass flow meter which has a configuration as mentioned above, the method for measuring a flow rate in a thermal type mass flow meter according to the present embodiment includes;

supplying, as said input signal, a pulse signal whose signal intensity changes temporally so as to be either a first intensity or a second intensity lower than said first intensity, to said sensor wires, acquiring, as an output signal intensity, a signal intensity of the output signal which corresponds to said input signal whose signal intensity is said first intensity and is detected when a range of fluctuation of the signal intensity of the output signal per unit time is not more than a predetermined threshold value, among output signals outputted from said sensor circuit as a result of said pulse signal being supplied to said sensor wires, and calculating a flow rate of said fluid based on said output signal intensity.

As mentioned above, in the method for measuring a flow rate in a thermal type mass flow meter according to the present embodiment, a pulse signal whose signal intensity changes temporally so as to be either a first intensity or a second intensity lower than the above-mentioned first intensity is supplied to the above-mentioned sensor wires, as the above-mentioned input signal. Namely, in the method for measuring a flow rate in a thermal type mass flow meter according to the present embodiment, a pulse signal which has a predetermined pulse width and predetermined amplitude is supplied to the sensor wires, instead of (continuously) applying DC electric voltage (or DC electric current) to sensor wires as in the case of a conventional technology. In addition, the pulse signal supplied to sensor wires as an input signal intended for heat generation may also be controlled based on any of electric voltage and electric current.

As mentioned above, the input signal supplied to the sensor wires in the method for measuring a flow rate in a thermal type mass flow meter according to the present embodiment has a time period (first time period) during which its signal intensity is a first intensity and a time period (second time period) during which its signal intensity is a second intensity (lower than the first intensity). This first intensity can be made to be an intensity of an input signal needed for making the sensor wires generate heat enough for producing temperature difference between the sensor wire on an upstream side and the sensor wire on a downstream side, with which a mass flow rate of a fluid as a measuring target can be measured with desired accuracy. Namely, in the method for measuring a flow rate in a thermal type mass flow meter according to the present embodiment, a mass flow rate of a fluid can be measured with desired accuracy at a suitable timing in the first time period. On the other hand, the second intensity may be any signal intensity as long as it is lower than the first intensity as mentioned above, and it can be set to 0 (zero) typically. Therefore, in accordance with the method for measuring a flow rate in a thermal type mass flow meter according to the present embodiment, as compared with a conventional technology in which a signal intensity of an input signal is constant at the first intensity, amount of energy (electric energy) supplied to the sensor wires per unit time can be reduced. As a result, amount of heat generation from the sensor wires per unit time can be reduced, and the above-mentioned various problems resulting from heat generation from the sensor wires can be reduced.

Alternatively, in accordance with the method for measuring a flow rate in a thermal type mass flow meter according to the present embodiment, a signal intensity of the input signal (amplitude of a pulse signal) supplied to the sensor wires can be increased, while suppressing increase in energy amount (electric energy) supplied to the sensor wires per unit time. As a result, an output power from the sensor circuit can be strengthened to raise an S/N ratio of a detection signal and measurement accuracy of a mass flow rate, while suppressing increase in the amount of heat generation from the sensor wires per unit time.

A specific method for supplying a pulse signal which has a predetermined pulse width and predetermined amplitude as mentioned above to sensor wires is not limited in particular, and it can be suitably chosen from various methods well-known as a method for generating a pulse signal to a person skilled in the art. For example, pulse electric voltage which has a predetermined pulse width and a predetermined period is generated by a function generator. By applying the pulse electric voltage thus generated to a base of a transistor interposed in a wiring for applying heat-generating electric voltage with a predetermined electric voltage value to sensor wires, the pulse electric voltage which has a predetermined pulse width and a predetermined period can be applied to the sensor wires (for example, refer to FIG. 4).

However, although a case where pulse electric voltage which has a predetermined pulse width and predetermined amplitude is applied as an input signal to sensor wires was explained in the above-mentioned exemplification, pulse electric voltage does not necessarily need to be applied with a predetermined period as long as it is possible to correctly detect an output signal from a sensor circuit. Namely, lengths (durations) of the above-mentioned first time period and second time period are not necessarily constant respectively. In addition, the lengths of the first time period (for example, pulse width of pulse electric voltage) and the second time period can be suitably set based on response speed of a constituent element of a detection means for detecting an output signal from a sensor circuit (for example, an A/D converter and a sample-hold circuit (if used), etc.), etc.

Furthermore, when a pulse signal which has a predetermined period is supplied to sensor wires like the above-mentioned exemplification, a period of the pulse signal can also be suitably set based on response speed of a constituent element of a detection means for detecting an output signal from a sensor circuit (for example, an A/D converter and a sample-hold circuit (when used), etc.), etc., for example. As an example of such a pulse signal set in this way, a pulse electric voltage which has a pulse width of 0.11 ms (millisecond), amplitude of 8 V (or 24V) and a period of 1.0 ms (namely, a duty ratio is 1/9) can be mentioned, for example.

Furthermore, in the method for measuring a flow rate in a thermal type mass flow meter according to the present embodiment, a signal intensity of the output signal which corresponds to the above-mentioned input signal whose signal intensity is the above-mentioned first intensity and is detected when a range of fluctuation of the signal intensity of the output signal per unit time is not more than a predetermined threshold value is acquired as an output signal intensity, among output signals outputted from the above-mentioned sensor circuit as a result of the above-mentioned pulse signal being supplied to the above-mentioned sensor wires. For example, transition of an output signal (for example, output electric voltage) from a sensor circuit as a result of supplying a pulse signal (for example, pulse electric voltage) to sensor wires is measured by a preliminary experiment, etc. Based on this measurement result, a time period when a signal intensity of an input signal a signal corresponds to the output signal is the first intensity and a range of fluctuation of the signal intensity of the output signal per unit time is not more than a predetermined threshold value (namely, approximately constant) has been determined previously. At a certain timing (for example, 0.05 ms (millisecond) after a leading edge of a pulse electric voltage) in the time period thus determined, a signal intensity (for example, value of output electric voltage) of an output signal outputted from a sensor circuit can be acquired as an output signal intensity.

Therefore, when supplying, as an input signal, a pulse signal which has a predetermined period to sensor wires, a period with which a signal intensity of an output signal outputted from a sensor circuit is acquired as an output signal intensity may be synchronized with a period of a pulse signal as an input signal supplied to the sensor wires. Specifically, what is necessary is just to configure a detection means for detecting an output signal from a sensor circuit so as to detect, as an output signal intensity, a signal intensity of the output signal outputted from the sensor circuit at a certain timing within a period when a signal intensity of the output signal from the sensor circuit is approximately constant as mentioned above. Furthermore, for example, a sample-hold circuit may be prepared in an input path to an A/D converter which digitizes the output signal from the sensor circuit to detect the output signal from the sensor circuit more certainly. In addition, the "predetermined threshold value" used as a criterion for judging whether the signal intensity of the output signal from the sensor circuit has become approximately constant or not can be determined suitably in consideration of detection accuracy of a detection means for detecting the output signal from the sensor circuit and/or a magnitude of noise in the thermal type mass flow meter according to the present embodiment, etc., for example.

Furthermore, in the method for measuring a flow rate in according to a thermal type mass flow meter, a flow rate of the above-mentioned fluid is calculated based on the above-mentioned output signal intensity. As mentioned above, an output signal from a sensor circuit corresponds to a mass flow rate of a fluid which flows through a sensor tube. On the other hand, as mentioned above, a bypass has a flow resistance against a fluid and is configured so that a fixed proportion of a fluid which flows through a passage branches to a sensor tube. Therefore, based on the proportion, a mass flow rate of a fluid which flows through a passage can be calculated from a mass flow rate of a fluid which flows through a sensor tube corresponding to an output signal from a sensor circuit.

However, in arithmetic processing for obtaining a mass flow rate of a fluid in an actual thermal type mass flow meter, a mass flow rate of the fluid which flows into a sensor tube does not necessarily need to be calculated. For example, a correspondence relation between an output signal intensity from a sensor circuit and a mass flow rate of a fluid which flows through a passage can be determined previously by a preliminary experiment, etc., and a mass flow rate of a fluid which flows through a passage can be directly obtained from an output signal intensity from the sensor circuit based on the correspondence relation.

Arithmetic processing as mentioned above as well as control on supply of an input signal to sensor wires and detection of an output signal from a sensor circuit as mentioned above can be performed using an electronic control unit, such as a microcomputer built in a thermal type mass flow meter, for example. Since details on of such an electronic control unit are well-known to a person skilled in the art, explanation thereof is omitted in the present specification.

By the way, as mentioned in the beginning, the present invention relates also to a thermal type mass flow meter which uses the method for measuring a mass flow rate which has been explained heretofore. The thermal type mass flow meter comprises a control part for performing the above-mentioned measurement method (for example, the above-mentioned electronic control unit, etc.).

Namely, a second embodiment of the present invention is a thermal type mass flow meter (thermal mass flow meter) comprising:
- a passage through which a fluid flows,
- a bypass which is prepared in the middle of said passage,
- a flow sensor which comprises a sensor tube that branches from said passage on an upstream side of said bypass and joins said passage again on a downstream side of said bypass, and a pair of sensor wires which is disposed so as to be not in direct contact with said fluid which flows through said sensor tube, but be able to conduct heat with the fluid which flows through said sensor tube,
- a power supply which is configured to supply an input signal for generating heat from said sensor wires to said sensor wires, and
- a sensor circuit which comprises a bridge circuit including said sensor wires, wherein:
- said thermal type mass flow meter (thermal mass flow meter) further comprises a first control part which is configured to control said power supply and said sensor circuit, and
- said first control part is further configured to calculate a flow rate of said fluid by performing the method according to said first embodiment of the present invention.

As mentioned above, the thermal type mass flow meter according to the present embodiment is a thermal type mass flow meter, to which the method for measuring a flow rate in a thermal type mass flow meter according to the above-mentioned first embodiment of the present invention is applied. Therefore, since a fundamental configuration of a thermal type mass flow meter has been already mentioned, referring to FIG. 1 and FIG. 2, etc., in the explanation of the method for measuring a flow rate in a thermal type mass flow meter according to the above-mentioned first embodiment of the present invention, it will not be explained here repeatedly.

However, as mentioned above, the thermal type mass flow meter according to the present embodiment further comprises a first control part which is configured to control the above-mentioned power supply and the above-mentioned sensor circuit, and the above-mentioned first control part calculates a flow rate of the above-mentioned fluid by performing the method according to the above-mentioned first embodiment of the present invention. More specifically, the first control part performs control on various arithmetic processing in the method according to the above-mentioned first embodiment of the present invention as well as supply of the pulse signal as the input signal to the sensor wires and detection of the output signal from the sensor circuit. Such first control part can be implemented as an electronic control unit, such as a microcomputer built in a thermal type mass flow meter, for example. In addition, in the above-mentioned FIG. 1, the first control part is illustrated as the control means 130.

Therefore, in accordance with the thermal type mass flow meter according to the present embodiment, in a time period after the first time period during which the signal intensity of the pulse signal supplied to the sensor wires is the first intensity comes before the next first time period comes (namely, the second time period), the signal intensity is the second intensity which is lower than the first intensity. For example, when the input signal is pulse electric voltage, in the pulse electric voltage supplied to the sensor wires, the first time period during which its electric voltage value is the first intensity (for example, 8 V) and the second time period during which its electric voltage value is the second intensity (for example, 0 (zero) V) comes by turns (alternately). Thereby, even if the signal intensity (for example, amplitude of pulse electric voltage) of the pulse signal being supplied to the sensor wires when detecting a flow rate of a fluid is the same (unchanged), energy amount (electric energy) supplied to the sensor wires per unit time can be reduced (since accumulated application duration or accumulated electrification duration to the sensor wires becomes shorter). As a result, the amount of heat generation from the sensor wires per unit time can be reduced, and the above-mentioned various problems resulting from the heat generation from the sensor wires can be reduced.

Alternatively, in accordance with the thermal type mass flow meter according to the present embodiment, a signal intensity of the input signal (amplitude of the pulse signal) supplied to the sensor wires can be increased, while suppressing increase in energy amount (electric energy) supplied to the sensor wires per unit time. As a result, an output signal from the sensor circuit can be strengthened to raise an S/N ratio of a detection signal and measurement accuracy of a mass flow rate, while suppressing increase in the amount of heat generation from the sensor wires per unit time.

By the way, in a thermal type mass flow meter according to a conventional technology, as mentioned above as the first problem, problems, such as a zero-point variation resulting from a temporal change of a member which constitutes a flow sensor due to heat generated from sensor wires, are concerns. As mentioned above, among such members, the covering layer generally constituted by heat-resistant resin has large influence on the problems as mentioned above. Therefore, the method for measurement of the flow rate in a thermal type mass flow meter according to the above-mentioned first embodiment of the present invention exerts large effect, when applied to a thermal type mass flow meter which has a covering layer.

Therefore, the third embodiment of the present invention is,
- the thermal type mass flow meter (thermal mass flow meter) according to said second embodiment of the present invention, wherein:
- said sensor wires are disposed adjacent to said sensor tube, and
- said thermal type mass flow meter (thermal mass flow meter) further comprises a covering layer disposed around a portion where said sensor wires are disposed adjacent to said sensor tube.

Since the specific configuration of the covering layer, which the thermal type mass flow meter according to the present embodiment comprises, has been already mentioned in the explanation of the method for measuring a flow rate in a thermal type mass flow meter according to the above-mentioned first embodiment of the present invention, referring to FIG. 3, etc., it will not be explained here repeatedly.

As mentioned above, the temporal change of the covering layer due to the heat generated from the sensor wires may become a large cause for the problems, such as decrease in response speed of the thermal type mass flow meter and/or increase in a detection error, etc. In the thermal type mass flow meter according to the present embodiment, the sensor wires are disposed adjacent to the sensor tube (for example, the sensor wires are wound around the sensor tube). In the thermal type mass flow meter according to the present embodiment, although the covering layer is disposed around a portion where the sensor wires are thus disposed adjacent to the sensor tube, the method for measuring a flow rate in a thermal type mass flow meter according to the above-mentioned first embodiment of the present invention is applied thereto. As a result, the temporal change of the covering layer due to the heat generated from the sensor wires is suppressed, and the problems as mentioned above are avoided.

By the way, as mentioned in the beginning, the present invention relates not only to a method for measuring a flow rate in a thermal type mass flow meter and a thermal type mass flow meter which uses the method, but also to a thermal type mass flow control device which uses the thermal type mass flow meter. The thermal type mass flow control device controls a flow adjustment means based on a flow rate of a fluid calculated by the thermal type mass flow meter which uses the method for measuring a flow rate in a thermal type mass flow meter according to the present invention, and brings the flow rate of the fluid close to a desired value.

Namely, the fourth embodiment of the present invention is,
- a thermal type mass flow control device (thermal mass flow controller) comprising:
  - the thermal type mass flow meter (thermal mass flow meter) according to said second embodiment or said third embodiment of the present invention,
  - a flow adjustment means which is configured to control a flow rate of a fluid which flows through said passage, and
  - a second control part which is configured to control said flow adjustment means, wherein:
  - said second control part is configured to control said flow adjustment means based on the flow rate of said fluid calculated by said thermal type mass flow meter to bring the flow rate of said fluid close to a desired value.

As mentioned above, the thermal type mass flow control device according to the present embodiment is a thermal type mass flow control device which comprises the thermal type mass flow meter according to the above-mentioned second embodiment or the above-mentioned third embodiment of the present invention. Therefore, since a fundamental configuration of a thermal type mass flow meter has been already mentioned, referring to FIG. 1 to FIG. 3, etc., in the explanation of the method for measuring a flow rate in a thermal type mass flow meter and the thermal type mass flow meter which uses the method according to the above-mentioned first to third embodiments of the present invention, it will not be explained here repeatedly.

The thermal type mass flow control device according to the present embodiment comprises a flow adjustment means which is configured to control a flow rate of a fluid which flows through the above-mentioned passage, and a second control part which is configured to control the above-mentioned flow adjustment means, besides the thermal type mass flow meter. The flow adjustment means is not limited in particular, as long as it is possible to control a flow rate of a fluid which flows through the passage. As a specific example of the flow adjustment means, a flow control valve whose opening can be changed by an actuator can be mentioned, for example. The second control part is not limited, either, as long as it is possible to control the flow adjustment means to increase and decrease the flow rate of a fluid which flows through the passage. In the example shown in FIG. 1, the thermal type mass flow control device 100 comprises the flow adjustment means 120 which is configured to control the flow rate of a fluid which flows through the passage 114 and the second control part (contained in the control means 130 in FIG. 1) which is configured to control the flow adjustment means 120, besides the thermal type mass flow meter 110.

The flow adjustment means 120 comprises a flow control valve 121, a valve orifice 122, a diaphragm 123, an actuator 124, a valve drive circuit 125, a power supply that is not shown, etc., as shown in FIG. 1. The second control part contained in the control means 130 controls the flow adjustment means 120 based on the flow rate of the fluid calculated by the thermal type mass flow meter 110, and brings the flow rate of the fluid close to a desired value. More specifically, the second control part contained in the control means 130 compares the flow rate of the fluid calculated by the thermal type mass flow meter 110 with the desired value, and transmits a control signal according to the result to the valve drive circuit 125.

For example, when the flow rate of the fluid is less than the desired value, the second control part sends a control signal to the valve drive circuit 125 so that the opening of the flow control valve 121 is increased and the flow rate of the fluid is increased by the actuator 124. On the contrary, when the flow rate of the fluid is more than the desired value, the second control part sends a control signal to the valve drive circuit 125 so that the opening of the flow control valve 121 is decreased and the flow rate of the fluid is reduced by the actuator 124. In addition, although flow control of a fluid in a feedback mode was explained in the above-mentioned explanation, flow control of a fluid by the thermal type mass flow control device according to the present embodiment is not limited to a feedback mode, and it may be performed in other control modes, such as a feedforward mode, for example.

In addition, in the thermal type mass flow control device according to the embodiment shown in FIG. 1, both the first control part and the second control part are contained in the control means 130. However, all of these control parts and/or other control parts may be implemented as one control means in this way, or they may be implemented as individual control means (control parts) respectively. Alternatively, some of these control parts and/or other control parts may be implemented as one control means, while the remaining control parts may be implemented as individual control means (control parts) respectively.

In accordance with the thermal type mass flow meter, which the thermal type mass flow control device according to the present embodiment comprises, as mentioned above, the problems, such as a zero-point variation, resulting from the temporal change of a member which constitutes the flow sensor due to the heat generated from the sensor wires, etc. can be reduced. As a result, the thermal type mass flow control device according to the present embodiment can maintain a high control accuracy for a long time period, and can exert high reliability.

Alternatively, in accordance with the thermal type mass flow meter, which the thermal type mass flow control device according to the present embodiment comprises, as mentioned above, an output signal from the sensor circuit can be strengthened to raise an S/N ratio of a detection signal and measurement accuracy of a mass flow rate, while suppressing increase in the amount of heat generation from the sensor wires per unit time. As a result, the thermal type mass flow control device according to the present embodiment can exert higher control accuracy, while suppressing decrease in reliability, etc.

Hereafter, configurations of thermal type mass flow meters according to several embodiments of the present invention, etc. will be explained in more detail, sometimes referring to accompanying drawings. However, the explanations described below are only aimed at exemplification, and it should be not interpreted that the scope of the present invention is limited to the following explanations.

Example 1

In this example, a thermal type mass flow meter according to one embodiment of the present invention (working example), in which pulse electric voltage having a predetermined pulse width and predetermined amplitude is supplied as an input signal to sensor wires, was compared with a thermal type mass flow meter according to a conventional technology (comparative example), in which DC electric voltage is (continuously) applied to sensor wires. Specifically, in a state where electric energy supplied to sensor wires per unit time is fixed (the same with each other), output electric voltage as output signal intensities from sensor circuits which respective thermal type mass flow meters according to the working example and the comparative example were compared under an identical condition.

(1) Configuration of Thermal Type Mass Flow Meter

For both of the working example and the comparative example, thermal type mass flow control devices which have the configuration shown in FIG. 1. Therefore, the configuration of these thermal type mass flow control devices will not be explained here repeatedly, since it has been already explained. In addition, in both of the working example and the comparative example, alloy of nickel (Ni) and iron (Fe) was used as a material of sensor wires, the above-mentioned SUS316 was used as a material of a sensor tube, and polyimide was used as a material of a covering layer.

(2) Configuration of Sensor Circuit

Figure 4:
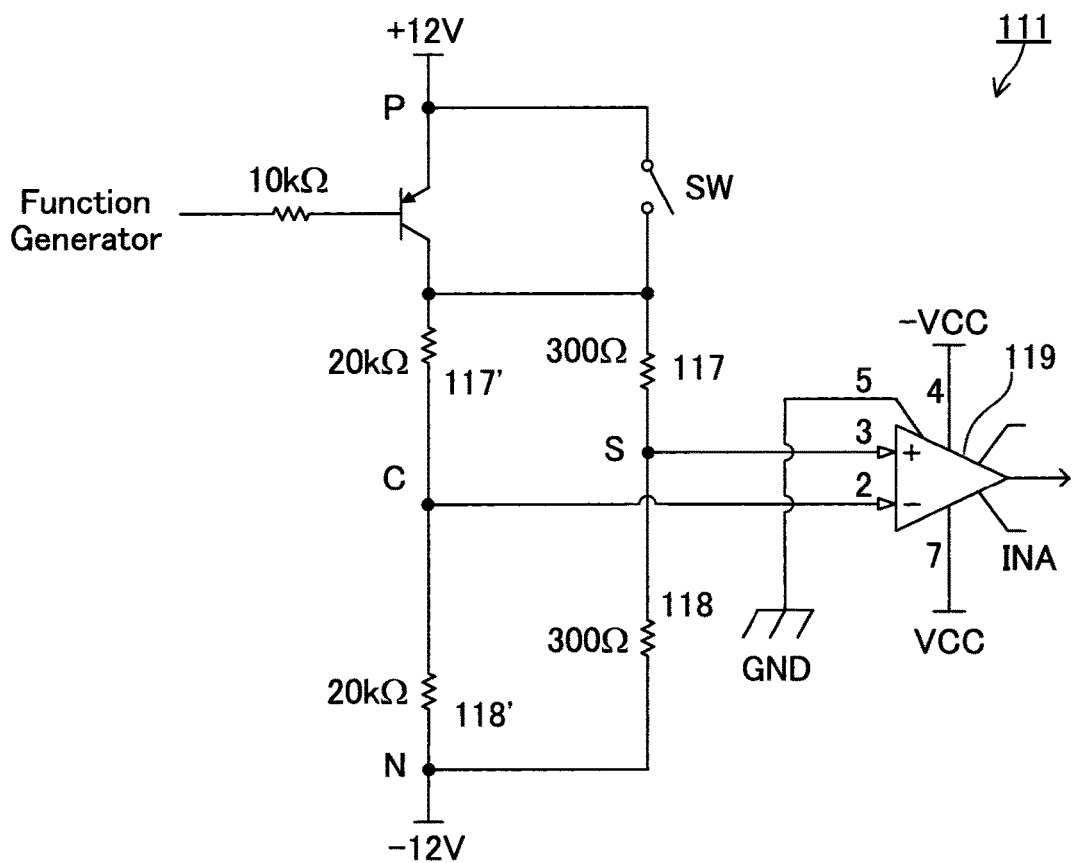
FIG. 4 is a schematic diagram for showing a configuration of a sensor circuit used for comparison between a thermal type mass flow meter according to a working example and a thermal type mass flow meter according to a comparative example.

In this example, as mentioned above, pulse electric voltage is applied to sensor wires in the thermal type mass flow meter according to the working example, while DC voltage is applied to sensor wires in the thermal type mass flow meter according to the comparative example, and output electric voltage from the sensor circuits, which respective thermal type mass flow meters comprise, are compared under an identical condition. Then, in this example, a sensor circuit shown in FIG. 4 was adopted. As mentioned above, FIG. 4 is a schematic diagram for showing a configuration of the sensor circuit used for comparison between the thermal type mass flow meter according to the working example and the thermal type mass flow meter according to the comparative example. In FIG. 4, same reference signs as those in FIG. 2 are given to constituent elements corresponding to constituent elements of the sensor circuit shown in FIG. 2.

First, in the thermal type mass flow meter according to the working example, voltage of 24 V was applied between a point P and a point N as voltage for making the sensor wires generate heat, in a state where a switch SW was turned OFF (opened), as shown in FIG. 4 (the point P side was set to +12 V, and the point N side was set to −12V). Furthermore, pulse electric voltage which was generated by the function generator and had a pulse width of 0.11 ms (millisecond) and a period of 1.0 ms (namely, a duty ratio is 1/9) was applied to a base of a transistor interposed between the point P and the resistive element (in parallel to the switch SW). Thus, in the thermal type mass flow meter according to the working example, the pulse electric voltage which has a pulse width of 0.11 ms and amplitude of 24 V was applied to the sensor wires with a period of 1.0 ms (refer to (a) of FIG. 5).

On the other hand, in the thermal type mass flow meter according to the comparative example, voltage of 8 V was applied between the point P and the point N as voltage for making the sensor wires generate heat, in a state where the switch SW was turned ON (closed). Thus, in the thermal type mass flow meter according to the comparative example, the above-mentioned voltage of 8 V was (continuously) applied to the sensor wires as DC voltage (namely, a duty the ratio is 1/1) in a state where the switch SW is closed in the thermal type mass flow meter according to the comparative example.

As mentioned above, the voltage (24 V) applied to the sensor wires in the thermal type mass flow meter according to the working example is three (3) times the voltage (8 V) applied to the sensor wires in the thermal type mass flow meter according to the comparative example. On the other hand, the duty rate (1/9) of the voltage applied to the sensor wires in the thermal type mass flow meter according to the working example is one ninth (1/9) of the duty rate (1/1) of the voltage applied to the sensor wires in the thermal type mass flow meter according to the comparative example. Therefore, electric energy supplied per unit time to the sensor wires in the thermal type mass flow meter according to the working example is equal to electric energy supplied per unit time to the sensor wires in the thermal type mass flow meter according to the comparative example.

In addition, in this example, for ease in experiment, the switch SW was interposed between the point P and the sensor wire 117 as mentioned above. Thereby, it becomes possible to switch the operation of the thermal type mass flow meter between an operation as the working example according to the present invention and an operation as the comparative example according to a conventional technology to realize the same in one sensor circuit. However, such a configuration was adopted absolutely in order to ease an experiment, and such a configuration should not be interpreted as indispensable for exploitation of the present invention.

(3) Configuration of Experimental Apparatus

Figure 6:
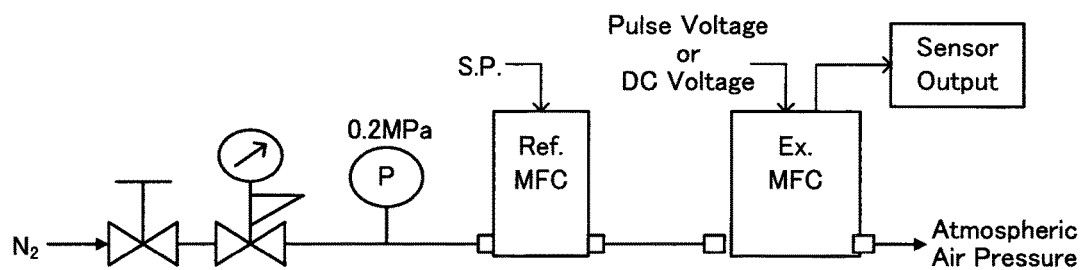
FIG. 6 is a schematic diagram for showing a configuration of an experimental apparatus used for comparison between a thermal type mass flow meter according to a working example and a thermal type mass flow meter according to a comparative example.

Next, a metering experiment of mass flow rates in respective thermal type mass flow meters constituted as mentioned above and according to the working example and comparative example was carried out using the experimental apparatus shown in FIG. 6. As shown in FIG. 6, nitrogen gas (N2) was used as a fluid. Moreover, in order from an upstream side of the passage through which the fluid flows, a mass flow control device (reference MFC) as a reference for controlling a flow rate of the fluid in the experimental apparatus and the thermal type mass flow meter according to the working example or comparative example as a mass flow control device (experimental MFC) were disposed in series.

In the experimental apparatus which has a configuration as mentioned above, pressure of the fluid in the passage on an inlet side of the reference MFC was adjusted to 0.2 MPa, and pressure of the fluid in the passage on an outlet side of the experimental MFC was made to be atmospheric air pressure (the passage on the outlet side was open). Moreover, in the reference MFC, the maximal flow rate of nitrogen gas (N2) as a fluid is set to 3 slm, and the flow adjustment means (flow control valve) of the reference MFC is controlled to flow the fluid at set flow rates of 0%, 10%, 30%, 40%, 50%, 60% and 67% of this maximal flow rate, and the results of the flow measurement by the experimental MFC at respective set flow rates were recorded. At this time, the flow adjustment means (flow control valve) of the experimental MFC was made fully open. Namely, in this example, the experimental MFC was operated not as a mass flow control device (MFC), but as a mass flow meter (MFM).

Figure 5:
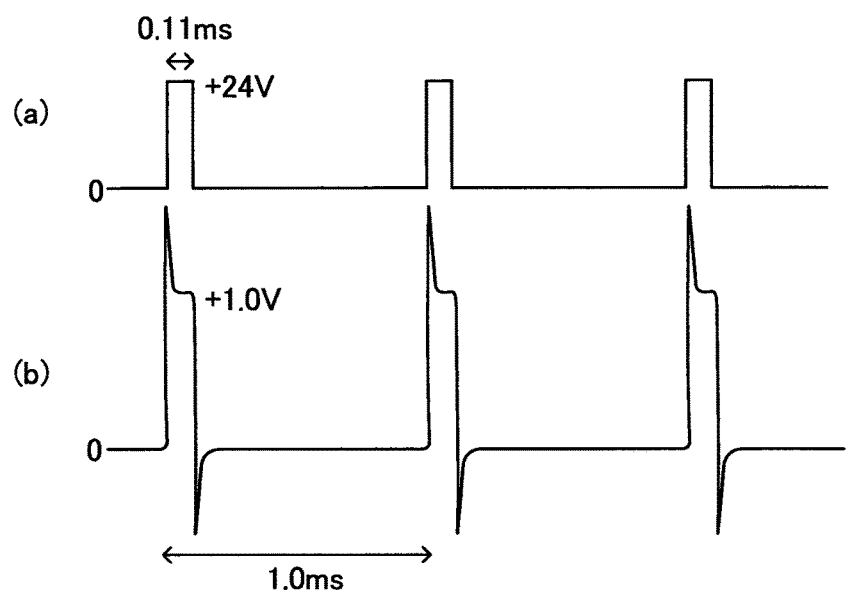
FIG. 5 is a typical graph for respectively showing (a) a waveform of a pulse electric voltage applied to sensor wires and (b) a waveform of an output signal outputted through an operational amplifier from a sensor circuit in a thermal type mass flow meter according to one embodiment of the present invention.

In the above-mentioned measure test, the output signal outputted through an operational amplifier from the sensor circuit, which the thermal type mass flow meter according to the working example comprises, presented a waveform as shown in (b) of FIG. 5, for example. In the waveform of the output signal, although a spike-like waveform is observed at a leading edge and a falling edge of the pulse electric voltage applied to the sensor wires, the waveform of the output signal becomes flat (approximately constant) after a predetermined time period has passed since the leading edge of the pulse electric voltage. In this example, an A/D converter was synchronized with the pulse electric voltage, and the value of the voltage detected 0.05 ms (millisecond) after the leading edge of the pulse electric voltage was sampled as an output signal intensity. In addition, it is considered that the above-mentioned spike waveform results from the inductance of the sensor wires wound around the sensor tube in the shape of coils. Moreover, the above-mentioned "approximately constant" refers to a state where a range of fluctuation of a signal intensity per unit time is not more than a predetermined threshold value, as mentioned above. That is, although not drawn on the waveform shown in (b) of FIG. 5, it is needless to sat that there may be a slight fluctuation of the signal intensity due to noise, for example, also in the flat portion of the output signal.

On the other hand, in the thermal type mass flow meter according to the comparative example, since the DC electric voltage was applied to the sensor wires as mentioned above, the output signal outputted through an operational amplifier from a sensor circuit was also DC electric voltage similarly to a thermal type mass flow meter according to a conventional technology. Therefore, in the thermal type mass flow meter according to the comparative example, an electric voltage value of the output signal thus outputted as DC electric voltage was sampled as an output signal intensity (4) Measurement Result Output signal intensities (output electric voltage values) from the sensor circuit, which respective thermal type mass flow meters according to the working example and comparative example comprise, at various set flow rates, measured as mentioned above, and ratios (E/C) of the output signal intensities in the working example to the output signal intensities in the comparative example are listed in the following Table 1.

TABLE 1

| Set Flow Rate [%] | Output Electric Voltage Value [V] | | |
|---|---|---|---|
| | Working Example (E) | Comparative Example (C) | Ratio (E/C) |
| 0 | 0 | 0 | — |
| 10 | 0.200 | 0.068 | 2.944 |
| 20 | 0.429 | 0.145 | 2.960 |
| 30 | 0.657 | 0.221 | 2.974 |
| 40 | 0.879 | 0.294 | 2.990 |
| 50 | 1.031 | 0.364 | 2.833 |
| 60 | 1.281 | 0.429 | 2.986 |
| 67 | 1.406 | 0.469 | 2.998 |

Figure 7:
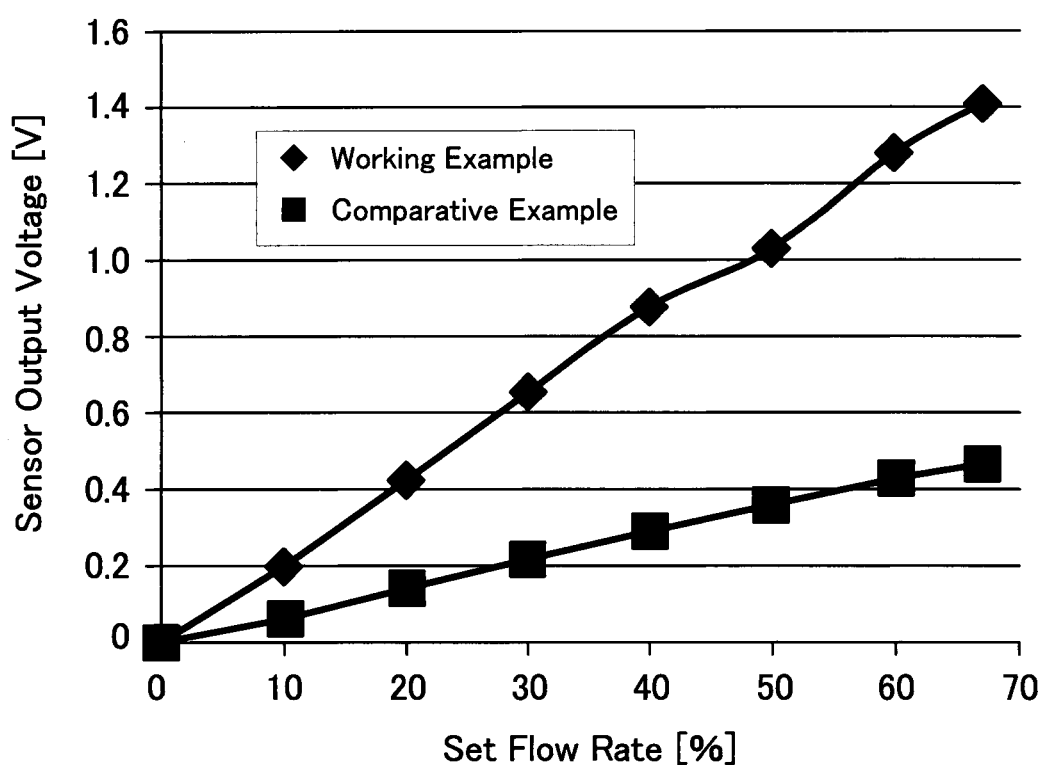
FIG. 7 is a typical graph for showing a relation between set flow rates and output electric voltages from a sensor circuit in respective thermal type mass flow meters according to a working example and a comparative example.

A graph which is obtained by plotting a relation between the output signal intensities (output electric voltage values) from the sensor circuit, which respective thermal type mass flow meters according to the working example and comparative example comprise, and the set flow rates shown in Table 1 is shown in FIG. 7. Also as apparent from Table 1 and FIG. 7, in both the thermal type mass flow meters according to the working example and comparative example, the output signal intensity from the sensor circuit was approximately proportional to the set flow rate. Moreover, in both the thermal type mass flow meters, amplitude of noise in the flat portion of the output waveform from the sensor circuit was constant at about 0.1 V, regardless of the magnitude of the output electric voltage value.

When comparing between the output signal intensities acquired in the respective thermal type mass flow meters according to the working example and comparative example, the output signal intensity of the thermal type mass flow meter according to the working example was 1.031 V, while the output signal intensity of the thermal type mass flow meter according to the comparative examples was 0.364 V, at a set flow rate of 50% (namely, 1.5 slm), for example. Similarly, at any set flow rates, the ratio of the output signal intensity of the thermal type mass flow meter according to the working example to the output signal intensity of the thermal type mass flow meter according to the comparative example was about 3, which was equivalent to the ratio of the electric voltage applied to the sensor wires.

(5) Evaluation

In the thermal type mass flow meter according to the working example, as compared with the thermal type mass flow meter according to the comparative example, the magnitude of the electric voltage applied to the sensor wires is increasing by 3 times and, as a result, the output signal intensity from the sensor circuit is also increased by about 3 times, as mentioned above. On the other hand, in both the thermal type mass flow meters, the amplitude of noise in the flat portion of the output waveform from the sensor circuit was constant at about 0.1 V regardless of the magnitude of the output signal intensity, as mentioned above. Therefore, in the thermal type mass flow meter according to the working example, as compared with the thermal type mass flow meter according to the comparative example, the S/N ratio in a flow rate measurement has been improved by about 3 times.

On the other hand, as mentioned above, the electric energy supplied per unit time to the sensor wires in the thermal type mass flow meter according to the working example is equal to the electric energy supplied per unit time to the sensor wires in the thermal type mass flow meter according to the comparative example. Therefore, the above-mentioned problems, such as a zero-point variation, resulting from the temporal change of a member which constitutes the flow sensor in association with heating the sensor tube and the fluid by the heat generated from the sensor wires, etc. does not get worse at least. Namely, it has been confirmed that, in accordance with the thermal type mass flow meter according to the working example, the output signal from the sensor circuit can be strengthened to raise the S/N ratio of a detection signal and measurement accuracy of a mass flow rate.

In addition, in this example, as mentioned above, by increasing the signal intensity (for example, amplitude of pulse electric voltage) of the input signal supplied to the sensor wires while maintaining the energy amount (electric energy) supplied to the sensor wires, the S/N ratio of the detection signal from the sensor circuit and the measurement accuracy of a mass flow rate was raised while suppressing various problems due to the heat generation from the sensor wires. However, in accordance with the present invention, the duty ratio of the pulse signal may be decreased to reduce the energy amount (electric energy) supplied to the sensor wires, while maintaining the signal intensity (for example, electric voltage value) of the input signal supplied to the sensor wires constant. In this case, the energy amount (electric energy) supplied to the sensor wires per unit time can be reduced, while suppressing decrease in the signal intensity of the output signal from the sensor circuit. As a result, the problems, such as a zero-point variation, resulting from the temporal change of a member which constitutes the flow sensor, etc. can be reduced, while suppressing decrease in the S/N ratio of a detection signal from the sensor circuit to suppress decrease in measurement accuracy of a mass flow rate.

In the above, when the intensity of the output signal from the sensor circuit should be maintained completely to maintain the measurement accuracy of a mass flow completely, the amplitude of the pulse electric voltage applied to the sensor wires may be increased unless reduction effect of the power supply to the sensor wires by decreasing the duty ratio of the pulse electric voltage is lost. Thus, in accordance with the present invention, extent of various problems resulting from heat generation from sensor wires and measurement accuracy of a mass flow rate can be balanced suitably by properly adjusting the respective of amplitude and a duty ratio of a pulse signal supplied to sensor wires.

Example 2

In this example, reduction of power consumption in the sensor wires was tried by operating the switch SW in the thermal type mass flow meter according to the comparative example in Example 1 to supply DC electric power to the sensor wires only in a time period during which the output signal from the sensor circuit is acquired, as mentioned in the beginning. Then, a time period taken to reach a thermal equilibrium state from an initiation and shutdown of electric power supply to the sensor wires was measured in the thermal type mass flow meter according to the comparative example in Example 1.

As a result of the above, in the above-mentioned thermal type mass flow meter, a time period required from an initiation of supply of a predetermined DC electric voltage (8 V) to the sensor wires until an intensity of an output signal from the sensor circuit becoming stable (reaching a thermal equilibrium state) was approximately 10 seconds. On the contrary, in the above-mentioned thermal type mass flow meter, a time period required from a shutdown of supply of a predetermined DC electric voltage (8 V) to the sensor wires until the intensity of the output signal from the sensor circuit becoming stable (reaching a thermal equilibrium state) was also approximately 10 seconds.

Therefore, when DC electric power is intermittently supplied to the sensor wires in the above-mentioned thermal type mass flow meter like the conventional technology mentioned in the beginning, a mass flow of a fluid can be measured only once in approximately 20 seconds (=10 seconds+10 seconds). It is needless to say that such a measurement frequency is insufficient for uses in which it is desired to always monitor an accurate flow rate of a fluid (for example, use in which a mass flow rate of the fluid (process gas) supplied into a chamber in a manufacturing process of a semiconductor, etc.). Namely, even though the method according to the conventional technology mentioned in the beginning is applied to the above-mentioned thermal type mass flow meter, an accurate flow rate of a fluid cannot be measured timely although power consumption in sensor wires can be reduced.

On the other hand, in the thermal type mass flow meter according to the working example (present invention) in Example 1, pulse electric voltage which has a pulse width of 0.11 ms and amplitude of 24 V as mentioned above is applied to the sensor wires with a period of 1.0 ms. Also in this case, a thermal time constant of the above-mentioned thermal type mass flow meter is the same as the above, and a time period required for reaching a thermal equilibrium state is also approximately 10 seconds. Therefore, in this case, about 10000 (=10 seconds/1.0 ms) flow rate measurements are performed in the time period required for reaching a thermal equilibrium state.

Furthermore, as mentioned in Example 1, in each pulse, the value of the electric voltage detected when a predetermined period (0.05 ms) has passed and the waveform of the output signal has become flat (approximately constant) is acquired as the output signal intensity after the leading edge of the pulse electric voltage. Namely, in each pulse, a thermal equilibrium state has been reached instantaneously and locally, and a mass flow rate of a fluid in such a thermal equilibrium state is measured with a very short period (1.0 ms) every moment. Therefore, in accordance with the method for measuring a flow rate in a thermal type mass flow meter according to the present invention, a mass flow of a fluid can be measured substantially continuously by supplying a pulse signal as an input signal to the sensor wires.

In addition, as mentioned in Example 1, reduction effect of power consumption in sensor wires and improvement effect of measurement accuracy of a mass flow rate can be balanced suitably by properly adjusting the respective of amplitude and a duty ratio of a pulse signal supplied to sensor wires.

As mentioned above, although some embodiments which have specific configurations have been explained for the purpose of explaining the present invention, the scope of the present invention is not limited to these exemplary embodiments, and it is needless to say that modification can be added properly within a limit of matters described in the claims and the specification.

The invention claimed is:

1. A thermal mass flow rate measurement method in a thermal type mass flow meter, the method comprising:
 passing a gas through a sensor tube, the sensor tube including an upstream end and a downstream end;
 simultaneously heating both of two sensor wires by simultaneously supplying pulses to the two sensor wires to form a pulse signal as an input signal to both of the two sensor wires of a sensor circuit to heat the gas in the sensor tube with energy given by the pulses, an upstream one of the sensor wires is positioned proximate to an upstream end of the sensor tube and a downstream one of the two sensor wires is positioned proximate to the downstream end of the sensor tube, the two sensor wires forming a portion of a bridge circuit, and the two sensor wires are thermally coupled to the sensor tube wherein the pulse signal alternates between a first intensity for each of the pulses and a 0 (zero) intensity between the pulses;
 receiving an output signal from the sensor circuit;
 acquiring, as an output signal intensity, a signal intensity of the output signal which results from said input signal at said first intensity simultaneously heating both of the two sensor wires and heat from the upstream one of the sensor wires being conveyed to the downstream one of the sensor wires via the gas passing through the sensor tube to cause a temperature difference between the upstream one of the sensor wires and the downstream one of the sensor wires;
 wherein the output signal intensity is detected when a range of fluctuation of the signal intensity of the output signal per unit time is not more than a predetermined threshold value; wherein the output signal intensity is detected from among output signals outputted from said sensor circuit; and calculating a mass flow rate of said gas based on said output signal intensity that results from the temperature difference between the upstream one of the sensor wires and the downstream one of the sensor wires, wherein the pulses occur multiple times to simultaneously heat both of the sensor wires in a measurement period that is a time period required for reaching a thermal equilibrium state and the output signal intensity becoming stable.

2. The thermal mass flow measurement method in a thermal type mass flow meter according to claim 1, wherein:

said first intensity of said pulse signal as said input signal is larger than a signal intensity of a direct-current electric power in a case where said direct-current electric power is used as said input signal to supply to said sensor wires a same amount of electric energy per unit time as said pulse supplies.

3. The thermal mass flow measurement method in a thermal type mass flow meter according to claim 1, wherein:

an amount of electric energy per unit time supplied by said pulse signal as said input signal is smaller than an amount of electric energy per unit time supplied by a direct-current electric power in a case where a signal intensity of said direct-current electric power is said first intensity.

4. A thermal mass flow meter comprising:

a passage through which a gas flows;

a bypass which is prepared in the middle of said passage;

a flow sensor which comprises:

a sensor tube that branches from said passage on an upstream side of said bypass and joins said passage again on a downstream side of said bypass; and a pair of sensor wires which is disposed so as to be not in direct contact with said gas which flows through said sensor tube, but be able to conduct heat with the gas which flows through said sensor tube, an upstream one of the pair of sensor wires is positioned along the sensor tube proximate to the upstream side of the bypass and a downstream one of the pair of sensor wires is positioned along the sensor tube proximate to the downstream side of the bypass;

a power supply which is configured to supply an input signal to said pair of sensor wires for generating heat from said pair of sensor wires to heat the gas in the sensor tube with energy given by the input signal, a sensor circuit which comprises a bridge circuit including said pair of sensor wires the sensor circuit configured to provide the input signal simultaneously to both the upstream one of the pair of sensor wires and the downstream one of the pair of sensor wires, and the sensor circuit is configured to provide an output signal with a magnitude that is proportional to a difference between a resistance of the upstream one of the pair of sensor wires and a resistance of the downstream one of the pair of sensor wires; and a first control part configured to control said power supply and said sensor circuit, said first control part is further configured to calculate a flow rate of said gas by:

supplying pulses to form, as said input signal to said pair of sensor wires, a pulse signal, wherein the pulse signal alternates between a first intensity for each of the pulses and a 0 (zero) intensity between the pulses;

acquiring, as an output signal intensity, a signal intensity of the output signal which results from said first intensity of said input signal simultaneously heating the pair of sensor wires and heat from the upstream one of the sensor wires being conveyed to the downstream one of the sensor wires via the gas passing through the sensor tube to produce the output signal with a magnitude that is proportional to a mass flow rate of the gas;

wherein the output signal intensity is detected when a range of fluctuation of the signal intensity of the output signal per unit time is not more than a predetermined threshold value, and wherein the output signal intensity is detected from among output signals outputted from said sensor circuit; and calculating a mass flow rate of said gas based on said output signal intensity that results from the temperature difference between the upstream one of the sensor wires and the downstream one of the sensor wires, wherein the pulses occur multiple times to simultaneously heat both of the sensor wires in a measurement period that is a time period required for reaching a thermal equilibrium state and the output signal intensity becoming stable.

5. The thermal mass flow meter of claim 4, wherein said first intensity of said pulse signal as said input signal is larger than a signal intensity of a direct-current electric power in a case where said direct-current electric power is used as said input signal to supply to said sensor wires a same amount of electric energy per unit time as said pulse signal supplies.

6. The thermal mass flow meter of claim 4, wherein an amount of electric energy per unit time supplied by said pulse signal as said input signal is smaller than an amount of electric energy per unit time supplied by a direct-current electric power in a case where a signal intensity of said direct-current electric power is said first intensity.

7. The thermal mass flow meter according to claim 4, wherein:

said sensor wires are disposed adjacent to said sensor tube, and said thermal mass flow meter further comprises a covering layer disposed around a portion where said sensor wires are disposed adjacent to said sensor tube.

8. A thermal mass flow controller comprising:

a passage through which a gas flows;

a bypass which is prepared in the middle of said passage;

a flow sensor which comprises a sensor tube that branches from said passage on an upstream side of said bypass and joins said passage again on a downstream side of said bypass, and a pair of sensor wires which is disposed so as to be not in direct contact with said gas which flows through said sensor tube, but be able to conduct heat with the which flows through said sensor tube, an upstream one of the pair of sensor wires is positioned along the sensor tube proximate to the upstream side of the bypass and a downstream one of the pair of sensor wires is positioned along the sensor tube proximate to the downstream side of the bypass;

a power supply which is configured to supply an input signal to said pair of sensor wires for generating heat from said pair of sensor wires to heat the gas in the sensor tube with energy given by the input signal;

a sensor circuit which comprises a bridge circuit including said pair of sensor wires the sensor circuit configured to provide the input signal simultaneously to both the upstream one of the pair of sensor wires and the downstream one of the pair of sensor wires, and the sensor circuit is configured to provide an output signal with a magnitude that is proportional to a difference between a resistance of the upstream one of the pair of sensor wires and a resistance of the downstream one of the pair of sensor wires;

a first control part configured to control said power supply and said sensor circuit, said first control part is further configured to calculate a flow rate of said gas by:

supplying pulses to form, as said input signal to said sensor wires, a pulse signal, wherein the pulse signal alternates between a first intensity for each of the pulses and a 0 (zero) intensity between the pulses;

acquiring, as an output signal intensity, a signal intensity of the output signal which results from said first intensity of said input signal simultaneously heating the pair of sensor wires and heat from the upstream one of the sensor wires being conveyed to the downstream one of the sensor wires via the gas passing through the sensor tube to produce the output signal with a magnitude that is proportional to a mass flow rate of the gas;

wherein the output signal intensity is detected when a range of fluctuation of the signal intensity of the output signal per unit time is not more than a predetermined threshold value, and wherein the output signal intensity is detected from among output signals outputted from said sensor circuit; and calculating a mass flow rate of said gas based on said output signal intensity that results from the temperature difference between the upstream one of the sensor wires and the downstream one of the sensor wires, wherein the pulses occur multiple times to simultaneously heat both of the sensor wires in a measurement period that is a time period required for reaching a thermal equilibrium state and the output signal intensity becoming stable;

a flow adjustment means which is configured to control a mass flow rate of the gas which flows through said passage, and a second control part which is configured to control said flow adjustment means, and wherein said second control part is configured to control said flow adjustment means based on the flow rate of said gas calculated by said thermal type mass flow meter to bring the flow rate of said gas close to a desired value.

9. The thermal mass flow controller of claim 8, wherein said first intensity of said pulse signal as said input signal is larger than a signal intensity of a direct-current electric power in a case where said direct-current electric power is used as said input signal to supply to said sensor wires a same amount of electric energy per unit time as said pulse signal supplies.

10. The thermal mass flow controller of claim 8, wherein an amount of electric energy per unit time supplied by said pulse signal as said input signal is smaller than an amount of electric energy per unit time supplied by a direct-current electric power in a case where a signal-intensity of said direct-current electric power is said first intensity.

11. The thermal mass flow controller according to claim 8, wherein:

said sensor wires are disposed adjacent to said sensor tube, and a covering layer is disposed around a portion where said sensor wires are disposed adjacent to said sensor tube.

* * * * *